(12) United States Patent
Vladimerou et al.

(10) Patent No.: US 11,412,357 B2
(45) Date of Patent: Aug. 9, 2022

(54) SYSTEM AND METHOD FOR PROVIDING SERVICES TO VEHICLES

(71) Applicant: Toyota Motor Engineering & Manufacturing North America, Inc., Plano, TX (US)

(72) Inventors: Vladimeros Vladimerou, Whitmore Lake, MI (US); Stephen Paul McFarland, Jr., Allen, TX (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 342 days.

(21) Appl. No.: 16/398,521

(22) Filed: Apr. 30, 2019

(65) Prior Publication Data
US 2020/0351630 A1    Nov. 5, 2020

(51) Int. Cl.
*H04W 4/40* (2018.01)
*H04W 12/06* (2021.01)
*H04W 4/029* (2018.01)
*H04W 12/63* (2021.01)

(52) U.S. Cl.
CPC ............ *H04W 4/40* (2018.02); *H04W 4/029* (2018.02); *H04W 12/06* (2013.01); *H04W 12/63* (2021.01)

(58) Field of Classification Search
CPC ..... H04W 4/029; H04W 12/06; H04W 12/63; H04W 4/40; H04W 4/02; G08G 1/096775; H04L 67/12; H04L 61/1552
USPC ......................................................... 709/217
See application file for complete search history.

(56) References Cited

U.S. PATENT DOCUMENTS

| | | | |
|---|---|---|---|
| 6,757,262 B1 | 6/2004 | Weisshaar et al. | |
| 8,965,677 B2 | 2/2015 | Breed et al. | |
| 10,162,357 B2 | 12/2018 | Michalakis et al. | |
| 2014/0129137 A1 | 5/2014 | Yamashiro | |
| 2015/0347959 A1* | 12/2015 | Skaaksrud | H04B 17/3913 705/333 |
| 2017/0032402 A1 | 2/2017 | Patsiokas et al. | |
| 2018/0024826 A1* | 1/2018 | Caushi | G06F 8/65 717/172 |
| 2018/0302322 A1 | 10/2018 | Richardson et al. | |
| 2019/0278297 A1* | 9/2019 | Averhart | G05D 1/0278 |

* cited by examiner

*Primary Examiner* — Sibte H Bukhari
(74) *Attorney, Agent, or Firm* — Christopher G. Darrow; Darrow Mustafa PC

(57) ABSTRACT

In one embodiment, example systems and methods relate to a providing a regional server directory that identifies local servers and vehicles that can provide services to a requesting vehicle. A geographic area such as a country is divided into a plurality of regions. Each region is associated with a plurality of local servers that provide one or more driving related services with respect to the roads and highways that pass through their associated region. The services may include traffic light statuses, traffic speed and flow information, weather information, accident information, etc. The regional servers may further identify one or more other vehicles in their associated region that can similarly provide services. On a periodic basis, each of these regional servers communicates their associated regions and provided services to a directory server. The directory server may be one or more servers whose address is known to vehicles.

20 Claims, 5 Drawing Sheets

SYSTEM AND METHOD FOR PROVIDING SERVICES TO VEHICLES

TECHNICAL FIELD

The subject matter described herein relates, in general, to systems and methods for providing services to vehicles, and, in particular, to providing a centralized directory service that can identify local servers and services to vehicles based on the locations associated with the vehicles.

BACKGROUND

Currently, many vehicles communicate with one another by broadcasting information such as their speed, location, brake status, etc. Non-vehicle entities such as traffic signals may similarly broadcast information such as their current state (i.e., red or green), and how much time is remaining in that state. Other information that may be broadcast includes information related to traffic or weather conditions on a particular road or highway. A vehicle may receive the information broadcast by the vehicles and other entities and may use the information to perform tasks such as route planning or adaptive cruise control.

However, there are drawbacks associated with such systems. First, in less populated areas a vehicle may not be near any broadcasting vehicles and therefore may not receive any information. Second, in the event that a non-vehicle entity broadcaster becomes disabled (e.g., a traffic light stops broadcasting) there is no way for the vehicle to determine if the information can be retrieved from a different source.

SUMMARY

In one embodiment, example systems and methods relate to providing a regional server directory that identifies local servers and vehicles that can provide services to a requesting vehicle. A geographic area such as a country is divided into a plurality of regions. Each region is associated with a plurality of local servers that provide one or more driving related services with respect to the roads and highways that pass through their associated region. The services may include traffic light statuses, traffic speed and flow information, weather information, accident information, etc. The regional servers may further identify one or more other vehicles in their associated region that can similarly provide services. On a periodic basis, each of these regional servers communicates their associated regions and provided services to a directory server. The directory server may be one or more servers whose address is known to vehicles. When a vehicle enters a region (or is on a route that will pass through a region), the vehicle requests a regional server directory for that region from the directory server. The regional server directory identifies the regional servers that are associated with the region and includes the services provided by each of the regional servers. The regional server directory may further identify vehicles associated with the region that can also provide services. The vehicle may then use information from the regional server directory to communicate with the regional servers and/or vehicles in the region.

In one embodiment, a system for providing services to vehicles is provided. The system includes one or more processors and a memory communicably coupled to the one or more processors. The memory stores a communication module including instructions that when executed by the one or more processors cause the one or more processors to: send a request for a regional server directory to a directory server from a vehicle, wherein the request includes a location of the vehicle; and in response to the request, receive the regional server directory from the directory server by the vehicle, wherein the regional server directory is associated with a region that includes the location of the vehicle, wherein the regional server directory identifies one or more regional servers associated with the region, and further wherein each of the one or more servers is associated with one or more services. The memory further stores a feature module including instructions that when executed by the one or more processors cause the one or more processors to generate one or more feature maps for the captured image. The memory further stores a server module including instructions that when executed by the one or more processors cause the one or more processors to request a service of the one or more services associated with a selected regional server of the one or more regional servers identified by the regional server directory; and receive information associated with the requested service from the selected regional server.

Embodiments may include some or all of the following features. The one or more services include one or more of a traffic service, a public announcement service, a vehicle speed service, a weather service, a traffic light service, and an accident service. The request for the regional server directory may include authentication information that can be used by the directory server to authenticate the vehicle. The regional server directory may further identify one or more other vehicles associated with the region, wherein each of the one or more other vehicles is associated with one or more services. The service module may further include instructions that when executed by the one or more processors cause the one or more processors to: request a service of the one or more services associated with a selected other vehicle of the one or more other vehicles identified by the regional server directory by the vehicle; and receive information associated with the requested service from the selected other vehicle by the vehicle. Requesting the service of the one or more services associated with the selected other vehicle may include the vehicle requesting the service using a networking connection between the vehicle and the selected other vehicle. Requesting the service of the one or more services associated with the selected other vehicle may include the vehicle requesting the service indirectly through a regional server of the one or more regional servers.

In one embodiment, a method for providing services to vehicles is provided. The method includes: sending a request for a regional server directory to a directory server from a vehicle, wherein the request includes a location of the vehicle; in response to the request, receiving the regional server directory from the directory server by the vehicle, wherein the regional server directory is associated with a region that includes the location of the vehicle, wherein the regional server directory identifies one or more regional servers associated with the region, and further wherein each of the one or more servers is associated with one or more services; requesting a service of the one or more services associated with a selected regional server of the one or more regional servers identified by the regional server directory by the vehicle; and receiving information associated with the requested service from the selected regional server by the vehicle.

Embodiments may include some or all of the following features. The one or more services may include one or more of a traffic service, a public announcement service, a vehicle speed service, a weather service, a traffic light service, and an accident service. The request for the regional server directory may include authentication information that can be used by the directory server to authenticate the vehicle. The regional server directory further identifies one or more other vehicles associated with the region, wherein each of the one or more other vehicles is associated with one or more services. The method may further include: requesting a service of the one or more services associated with a selected other vehicle of the one or more other vehicles identified by the regional server directory by the vehicle; and receiving information associated with the requested service from the selected other vehicle by the vehicle. Requesting the service of the one or more services associated with the selected other vehicle may include the vehicle requesting the service using a networking connection between the vehicle and the selected other vehicle. Requesting the service of the one or more services associated with the selected other vehicle may include the vehicle requesting the service indirectly through a regional server of the one or more regional servers. The vehicle may be an autonomous vehicle.

In one embodiment, a method for providing services to vehicles is provided. The method includes: receiving at a directory server, from each of a plurality of regional servers, a list of services provided by the regional server, wherein each regional server is associated with a region of a plurality of regions; receiving a request for a regional server directory from a vehicle by the directory server, wherein the request includes a location of the vehicle; based on the location of the vehicle, determining one or more regions of the plurality of regions that correspond to the location of the vehicle by the directory server; generating a regional server directory by the directory server, wherein the regional server directory identifies each regional server that is associated with a region of the determined one or more regions; and providing the generated regional server directory to the vehicle by the directory server.

Embodiments may include some or all of the following features. The method may include authenticating the vehicle using information included in the received request. The method may further include: receiving at the directory server a list of other vehicles, wherein each vehicle is associated with a region of the plurality of regions, wherein the regional server directory further identifies each other vehicle of the list of other vehicles that is associated with a region of the determined one or more regions. The list of services may include one or more of a traffic service, a public announcement service, a vehicle speed service, a weather service, a traffic light service, and an accident service. The vehicle may be an autonomous vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
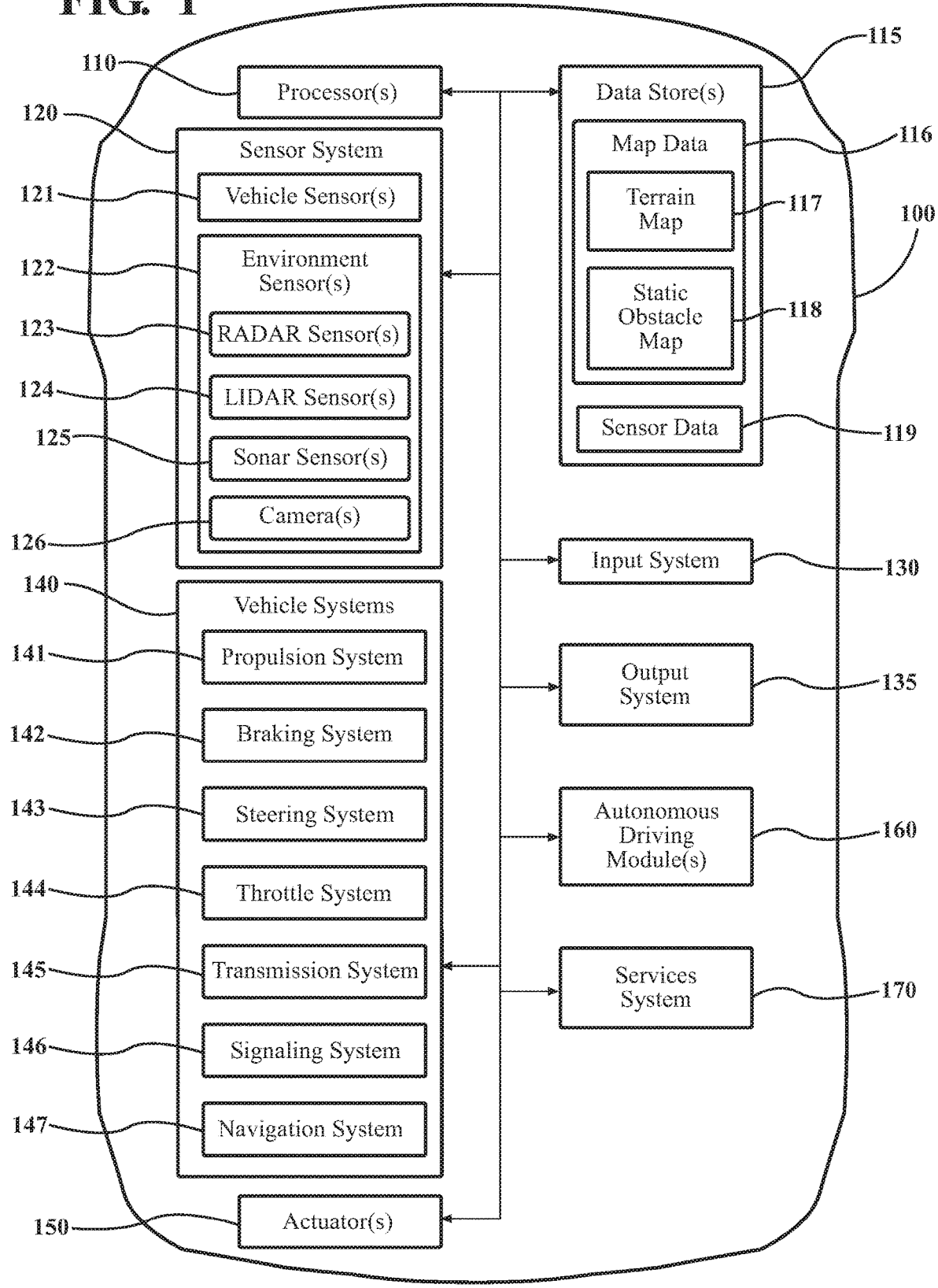
FIG. 1 illustrates one embodiment of a vehicle.

Systems, methods, and other embodiments associated with providing a regional server directory to vehicles are disclosed. As described above, vehicles such as the vehicle 100 of FIG. 1 often use information from one or more services to provide or enhance certain vehicle functions such as navigation, route planning, collision avoidance, and adaptive cruise control. Example services may include traffic services (e.g., traffic conditions on one or more roads), traffic light services (e.g., the status of nearby traffic lights), public announcement services, vehicle speed services (e.g., the average vehicle speed on a road), and any other type of services. The services may further include services provided by vehicles such as their current speed, brake conditions, destination, etc.

Typically, these services are broadcast to vehicles using what is commonly referred to as vehicle-to-vehicle ("V2V") communications. These V2V communications may be broadcast from vehicles to other vehicles, as well as from non-vehicle entities such as traffic lights or road side beacons.

While broadcasting services using V2V communications is effective, there are certain drawbacks associated with such an approach. V2V communications are typically low powered and only have a range of approximately several hundred meters. This may make it difficult for a vehicle to use the services in sparsely populated locations where broadcasting vehicles or other non-vehicle broadcasting entities may be infrequently encountered.

Accordingly, to help improve the ability of vehicles to use and share services, a services system is provided. In some embodiments, the services system uses a directory server to store and collect information from a plurality of regional servers. Each regional server provides various services to one or more geographic regions. For example, each county, town, or zip code may be associated with a different regional server. Alternatively, a regional server can be associated with one or more sections of a map grid or other earth grid reference system such as Military Grid Reference System (MGRS), Universal Transverse Mercator (UTM) or Open Location code (OLC or "Plus code").

As will be described further below, when a vehicle 100 enters a region, it may send a request to the directory server to request a service directory for the region. The service directory may identify the various regional servers that are associated with the region as well as the services that are provided by each regional server. The service directory may further include credentials, addresses, and other information that the vehicle 100 may use to contact the regional servers and request one or more of the various services that are provided. Depending on the embodiment, the service directory may further identify other vehicles that are associated with the region along with one or more services that are provided by the vehicles.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a services system 170 that is implemented to perform methods and other functions as disclosed herein relating to providing services to vehicles 100. The noted functions and methods will become more apparent with a further discussion of the figures.

Figure 2:
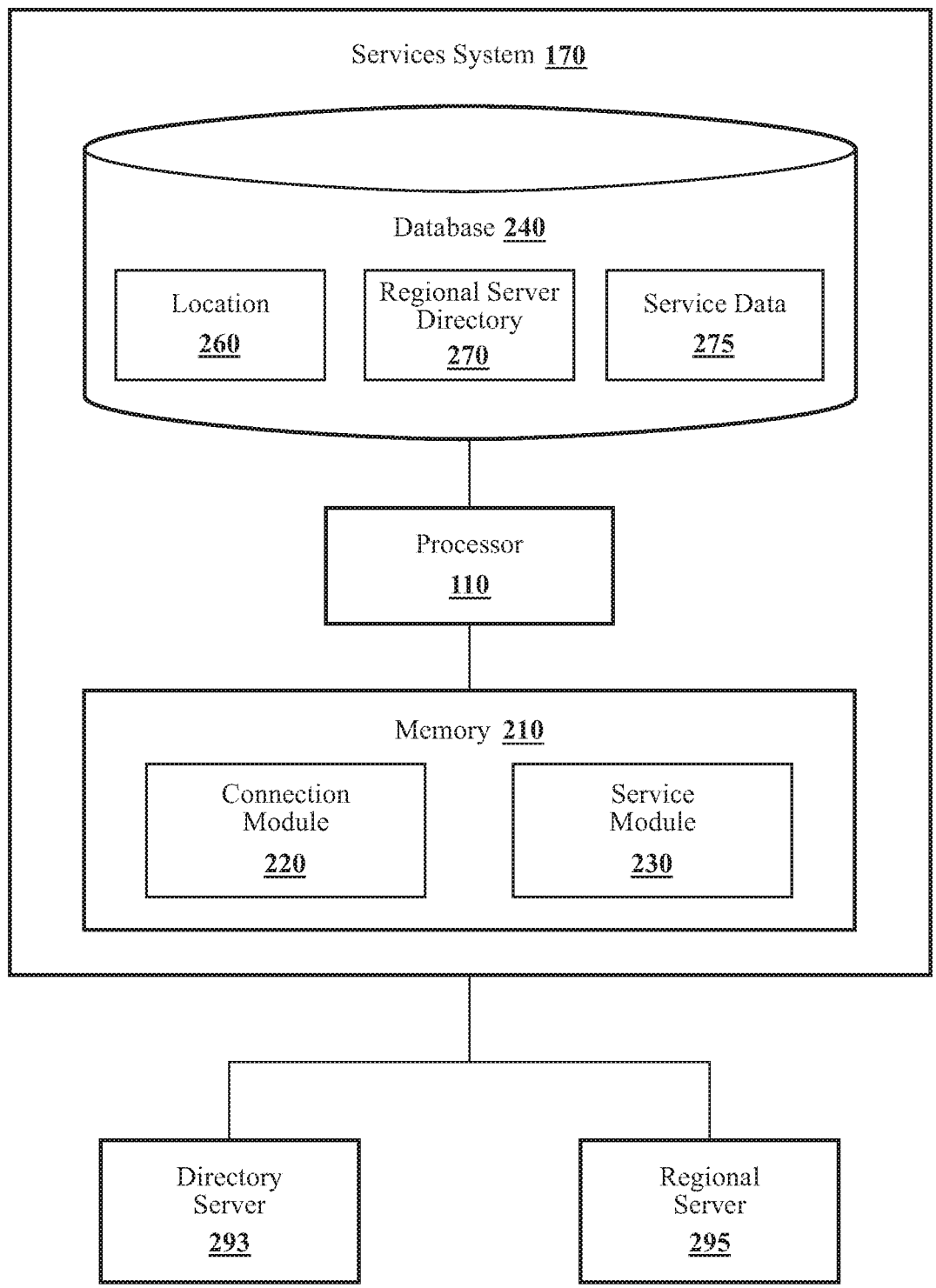
FIG. 2 illustrates one example of a services system as embodied herein.

With reference to FIG. 2, one embodiment of the services system 170 of FIG. 1 is further illustrated. The services system 170 is shown as including a processor 110 from the vehicle 100 of FIG. 1. Accordingly, the processor 110 may be a part of the services system 170, the services system 170 may include a separate processor from the processor 110 of the vehicle 100 or the services system 170 may access the processor 110 through a data bus or another communication path. It should be appreciated, that while the services system 170 is illustrated as being a single contained system, in various embodiments, the services system 170 is a distributed system that is comprised of components that can be provided as a centralized server, a cloud-based service, and so on. Moreover, the services system 170 described herein is not limited to vehicle-based implementations, but may be implemented using any general purpose computing device.

In one embodiment, the services system 170 includes a memory 210 that stores a connection module 220 and a service module 230. More or fewer modules may be supported. The memory 210 is a random-access memory (RAM), read-only memory (ROM), a hard-disk drive, a flash memory, or other suitable memory for storing the modules 220 and 230. The modules 220, and 230 are, for example, computer-readable instructions that when executed by the processor 110 cause the processor 110 to perform the various functions disclosed herein. Moreover, as previously noted, in various embodiments, one or more aspects of the services system 170 are implemented as cloud-based services, and so on. Thus, one or more modules of the services system 170 may be located remotely from other components and may be implemented in a distributed manner.

Furthermore, in one embodiment, the services system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 when executing various functions. In one embodiment, the database 240 includes a location 260 along with, for example, other information that is used and/or generated by the modules 220 and 230 such as one or more of a regional server directory 270 and service data 275. Of course, in further embodiments, the various information may be stored within the memory 210 or another suitable location.

The connection module 220 may be configured to request a regional server directory 270 from a directory server 293. The directory server 293 may be a server, or other computing device, whose address is known to the connection module 220. The directory server 293 may be a single computer, or multiple computers. In some embodiment, the directory server 293 may be implemented using a cloud-based computing environment.

The directory server 293 may communicate with a plurality of what are referred to as regional servers 295. A regional server 295 may be associated with one or more geographic regions of a plurality of geographic regions. Each geographic region may be an area such as a town, county, or city. In some embodiments, each geographic region may correspond to a zip code. However, other systems or techniques for dividing a geographic area into a plurality of geometric regions may be used. Each geographic region may be similarly sized, or may be differently sized depending on the number of roads and/or traffic in the geographic region.

Each regional server 295 may provide one or more services to vehicles located within its associated geographic region. The services may include any services typically provided by, or to, vehicles such as traffic services, weather services, traffic speed services, traffic light services, etc. For example, a regional server 295 may collect information from a variety of traffic lights (i.e., light status information) and information describing the current speed of traffic on one or more roads in the associated geographic region (i.e., lane speed information), and may provide this information to vehicles 100 as part of one or more services. The provided information is referred to herein as service data 275.

In addition, in some implementations, some or all of the regional servers 295 may collect service information regarding one or more other vehicles 100 that may be driving in their associated geographic region. The information collected about each vehicle 100 may include its current speed, current brake status, and current location, for example. Other information about each vehicle 100 may be collected.

Each regional server 295 may communicate the various services that it provides and its associated geographic region to the directory server 293. Each regional server 295 may further provide an address, credentials, or any other information that may be required or used by a vehicle 100 to request a service from the regional server 295. In addition, each regional server 295 may provide information about any vehicles 100 in the associated geographic region that may also provide services. Depending on the embodiment, the vehicle 100 may request services directly from one of these vehicles 100, or indirectly through the regional server 295 associated with the geographic region.

Figure 3:
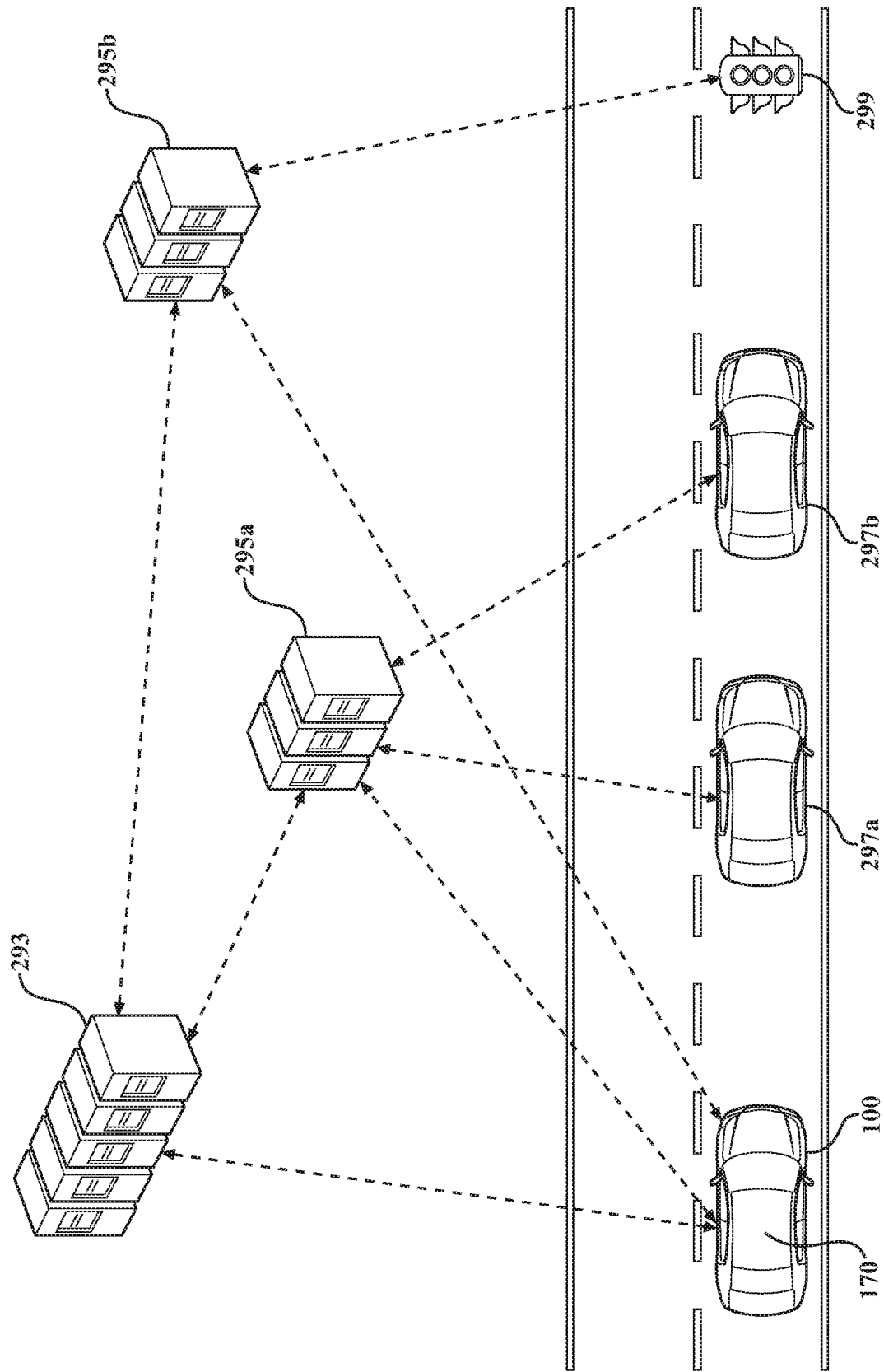
FIG. 3 is an illustration of an example environment that may be used to implement the services system described herein.

FIG. 3 is an illustration of an example environment that may be used to implement the services system 170 described herein. As shown, the environment includes a vehicle 100 with a services system 170. The vehicle 100 is driving on a road in a geographic region associated with a regional server 295a and a regional server 295b. Also on the road are a vehicle 297a, a vehicle 297b, and an entity 299. The entity 299 is shown as a traffic light, however other types of entities 299 may be supported. Each vehicle may or may not have a services system 170.

Each regional server 295 may provide a variety of services to vehicles 100 in the associated geographic region. Each regional server 295 may provide a directory server 293 with a list of the services that the regional server 295 may provide to vehicles 100. Each regional server 295 may further provide the directory server 293 with information such as an address that can be used by vehicles 100 to request services, and any credentials that may be needed by the vehicles 100 to request services.

In the example shown, the regional server 295a is shown as being in communication with the vehicles 297a and 297b, and may receive information from each of the vehicles 297a and 297b such as their speed, location, brake status, etc. Other information may be provided by the vehicles 297a and 297b to the regional server 295. Depending on the embodiment, the regional server 295a may receive information from all participating vehicles 297a and 297b in the geographic region associated with the regional server 295a. The regional server 295a may then expose the information provided by the vehicles 297a and 297b as a service to the vehicles 100. Accordingly, the regional server 295a may indicate to the directory server 293 that the regional server 295a can provide information associated with vehicles 297a and 297b in the geographic region as a service.

Similarly, the regional server 295b is shown as being in communication with the entity 299, and may receive information from the entity 299 such as its current light state (e.g., red, green, or yellow) or how much time is remaining until the next state change. Other information may be provided such as the amount traffic that is passing through the intersection associated with the entity 299, and the speed of the traffic that is passing through the intersection.

Depending on the embodiment, the regional server 295b may receive information from a variety of entities 299 in the geographic region associated with the regional server 295b. These may include entities 199 such as other traffic lights, traffic data providers, weather data providers, etc. Any entity 299 that is capable of providing information to a vehicle 100 may be included. The regional server 295b may then expose the information provided by the various entities 299 as a service to the vehicles 100. Accordingly, the regional server 295b may indicate to the directory server 293 that the regional server 295b can provide services data 275 associated with each entities 299 in the geographic region as a service.

When the vehicle 100 enters a new geographic region (or is traveling towards a new geographic region), the connection module 220 of the services system 170 may send a request to the directory server 293 for a regional server directory 270 associated with the new geographic region. In response, the directory server 293 may determine that the regional servers 295a and 295b are associated with the geographic region, and may generate a regional server directory 270 that identifies the services provided by the regional servers 295a and 295b. The directory server 293 may then provide the generated regional server directory 270.

Returning to FIG. 2, the service module 230 may be configured to request one or more services from a regional server 295 or vehicle identified by the regional server directory 270. Depending on the embodiment, the service module 230 may request one or more services based on requests received from one or more vehicle systems 140 or modules. For example, a vehicle system 140 such as the navigation system 147 may rely on service data 275 provided by services such as traffic services, vehicle speed services, and traffic light services when computing a route for the vehicle 100. Accordingly, the service module 230 may determine, using the regional server directory 270, which regional servers 295 provide a desired service, and may request the service from one or more of the determined regional servers 295 and vehicles.

Depending on the embodiment, the service module 230 may request a service from a regional server 295 using information contained in the regional server directory 270. The information may include an address (e.g., URL or IP address) of the regional server 295, and credentials that may be required to connect with the regional server 295. The credentials may include a username, password, or certificate. Other information may be included in the regional server directory 270.

In response to the request, the regional server 295 may provide the service module 230 with service data 275. The contents of the service data 275 may be dependent on the particular service that was requested. For example, if the service module 230 requested traffic data from the regional server 295, the service data 275 may include information such as the traffic conditions for various roads in the region associated with the regional server 295.

The service module 230 may further request a service from a vehicle 100 using information contained in the regional server directory 270. Depending on the embodiment, the service module 230 may request the service directly from a vehicle 100 using a network connection between the service module 230 and the vehicle 100. For example, the service module 230 may connect to a vehicle 100 using a cellular network provided by a cellular module or a component of the vehicle 100 accessible to the service module 230. Alternatively, the service module 230 may connect using a mobile phone or other device associated with a passenger in the vehicle 100.

In some implementations, the service module 230 may request a service from a vehicle 100 indirectly from a regional server using information contained in the regional server directory 270. For example, the service module 230 may request the service from a regional server 295 associated with the vehicle 100. The regional server 295 may then request the service from the vehicle, and may provide service data 275 received from the vehicle 100 to the service module 230 in response to the request.

As may be appreciated, the services system 170 provides many advantages over the prior art. First, because the vehicle 100 receives the regional server directory 270 from the directory server 293, the vehicle 100 only has to know or remember the address associated with the directory server 293 to learn about the various services provided by the regional servers 295 that are associated with a particular geographic region. Second, because the regional server directory 270 identifies a variety of regional servers 295 and vehicles 100 and their associated services, in the event that one of the regional servers 295 or vehicles 100 becomes unavailable, the vehicle 100 can select a different regional server 295 or vehicle 100 to request a service from.

Figure 4:
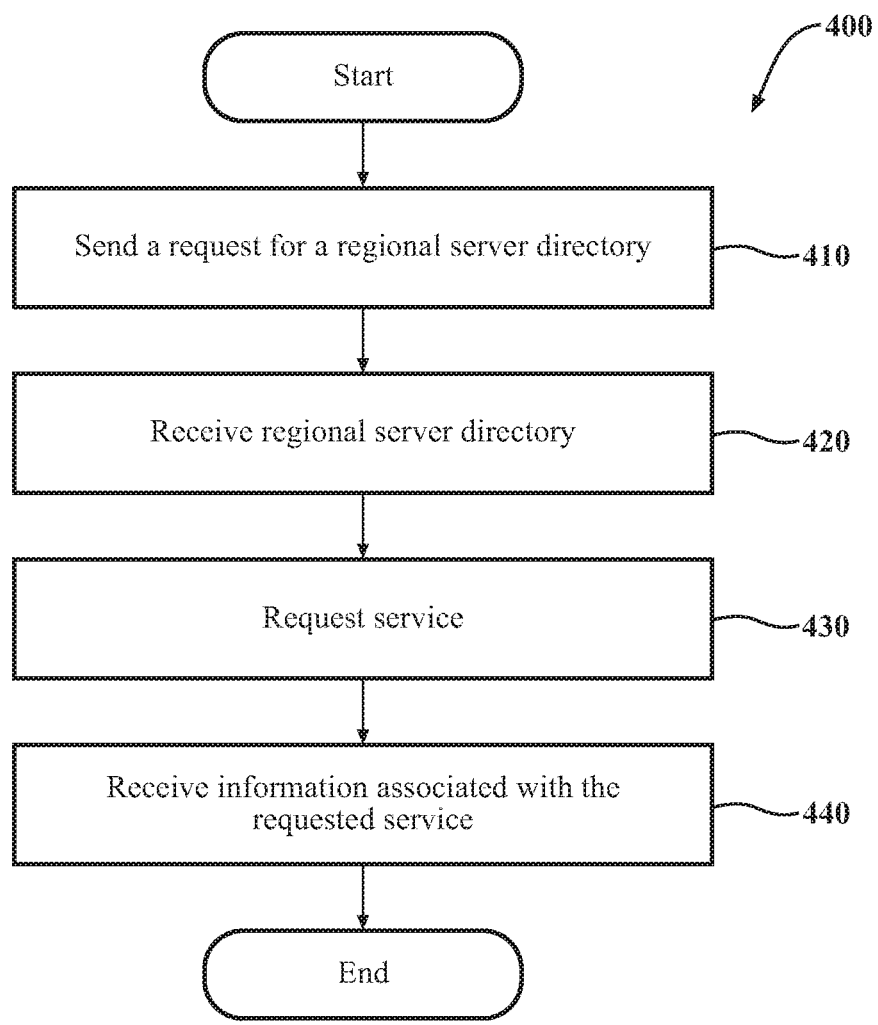
FIG. 4 illustrates a flowchart of a method that is associated with receiving information associated with one or more services from one or more regional servers.

Additional aspects of providing services by directory servers 293 and regional servers 295 will be discussed in relation to FIG. 4. FIG. 4 illustrates a flowchart of a method 400 that is associated with receiving information associated with one or more services from one or more regional server 295. The method 400 will be discussed from the perspective of the services system 170 of FIGS. 1 and 2. While the method 400 is discussed in combination with the services system 170, it should be appreciated that the method 400 is not limited to being implemented within the services system 170 but is instead one example of a system that may implement the method 400.

At 410, a connection module 220 sends a request for a regional server directory 270. The request may include a location 260 of an associated vehicle 100. The request may be a request for a regional server directory 270 associated with the geographic region that includes the location 260. The request may be received via a network such as the Internet. Depending on the embodiment, the request may be sent from a cellular or other networking component of the vehicle 100. Alternatively, the request may be sent via a smart phone or other device associated with a passenger of the vehicle 100.

In some embodiments, the request may be sent by the connection module 220 in advance of the vehicle 100 entering a new geographic region, and the location 260 may be a location within the new geographic region. In other embodiments, before sending a request for a regional server directory 270, the connection module 220 may first determine if a cached version of the regional server directory 270 is available on the vehicle 100, and may only send the request if no cached version is available or if the cached version is older than a threshold age.

Where the vehicle 100 is travelling on a route to a destination, the connection module 220 may request a regional server directory 270 for all geographic regions that the vehicle 100 will pass through as it travels to the destination. Alternatively, the connection module 220 may provide the route to the directory server 293, and the directory server 293 may determine the geographic regions that the vehicle 100 will pass through.

At 420, the connection module 220 receives the regional server directory 270. The connection module 220 may receive the regional server directory 270 from the directory server 293. The regional server directory 270 may identify some or all of the regional servers 295 that are associated with the geographic region that includes the location 260 of the vehicle provided in the request. The regional server directory 270 may further identify the services provided by each regional server 295.

At 430, the service module 230 requests a service. The service module 230 may request a service from one of the regional servers 295 indicated in the regional server directory 270. Depending on the embodiment, the service may be requested on behalf of one or more autonomous driving modules 160 associated with the vehicle 100 or one or more vehicle systems 140. For example, a vehicle system 140 such as a navigation system 147 may be planning an alternative route for the vehicle 100, and may have the service module 230 request services such as traffic services related to one or more upcoming roads.

At 440, the service module 230 receives information associated with the requested service. The service module 230 may receive the information associated with the requested service and may pass the information to one or more autonomous driving modules 160 and/or vehicle systems 140 that requested the service. Continuing the example above, if the information is associated with a weather service requested by the navigation system 147, the service module 230 may pass the information to the navigation system 147.

Figure 5:
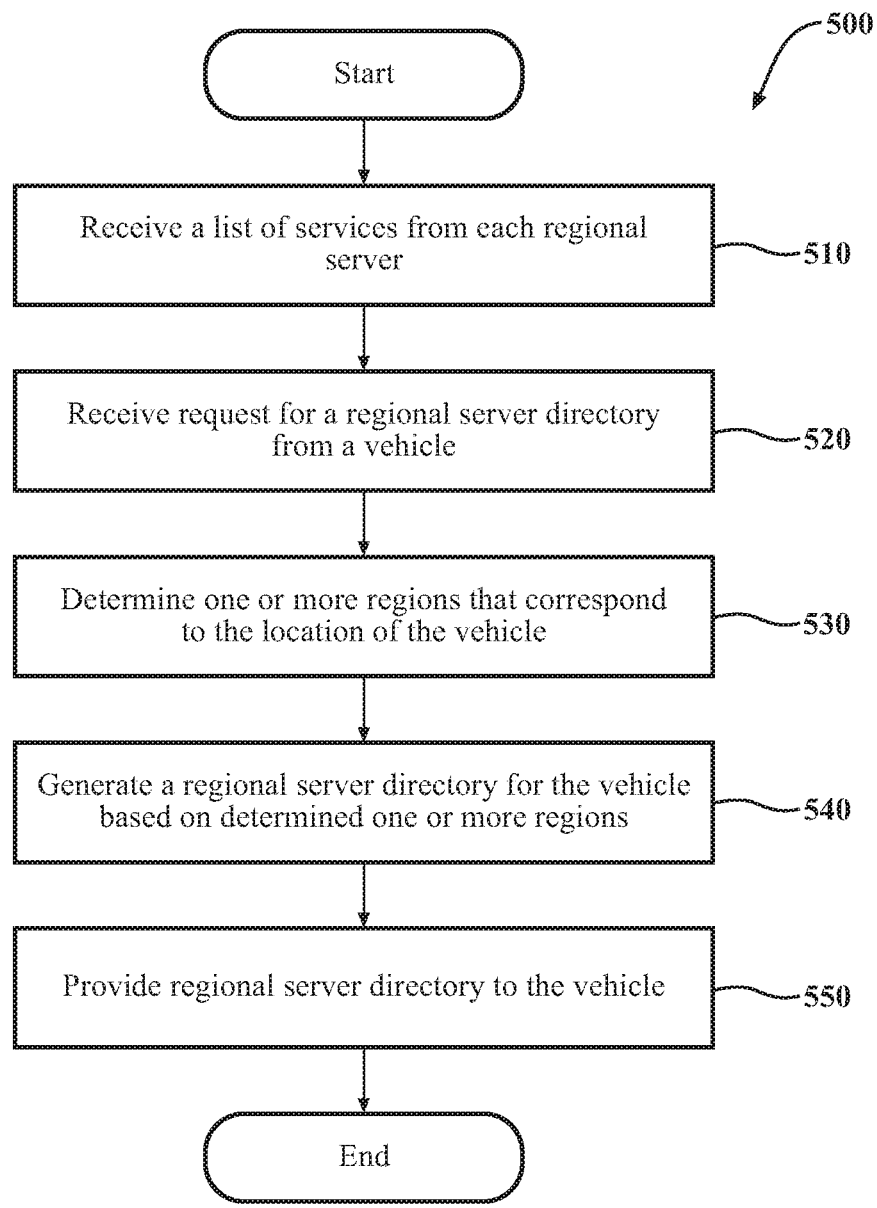
FIG. 5 illustrates a flowchart of a method that is associated with providing a regional server directory.

Additional aspects of providing services by directory servers 293 and regional servers 295 will be discussed in relation to FIG. 5. FIG. 5 illustrates a flowchart of a method 500 that is associated with providing a regional server directory 270. The method 500 will be discussed from the perspective of the services system 170 of FIGS. 1 and 2. While the method 500 is discussed in combination with the services system 170, it should be appreciated that the method 500 is not limited to being implemented within the services system 170 but is instead one example of a system that may implement the method 500.

At 510, the directory server 293 receives a list of services from each of one or more regional servers 295. Each regional server 295 may be associated with a geographic region of a plurality of geographic regions. The services that each regional server 295 provides may be vehicle related and may include services such as a traffic service, a public announcement service, a vehicle speed service, a weather service, a traffic light service, and an accident service. Depending on the embodiment, each regional server 295 may aggregate the services provided from one or more entities such as traffic lights or other vehicles. With respect to other vehicles, some of the regional servers 295 may act as a "vehicle connectivity server" and may allow a vehicle 100 to request or receives services either directly or indirectly from another vehicle. These services may include providing information such as the speed of the vehicle, the brake status of the vehicle, and a current location of the vehicle. Other services may be supported.

Depending on the embodiment, the directory server 293 may receive the list of services from each of the one or more regional servers 295 through a network such as the Internet. Other means for communications may be supported. Each regional server 295 may provide its list of services to the directory server 293 when requested, periodically, upon startup, or when a change has been made to one or more of the services provided by the regional server 295. In addition, each regional server 295 may provide information that may be used by a vehicle 100 to access the services provided by the regional server 295 such as an address of the regional server 295 and any necessary credentials (e.g., passwords and tokens).

At 520, the directory server 293 receives a request for a regional server directory 270 from a vehicle 100. The request may include a current (or future) location 260 of the vehicle 100. Alternatively or additionally, the request may include multiple locations 260 associated with the vehicle 100. For example, the locations 260 may correspond to a route currently being traveled by the vehicle 100.

Depending on the embodiment, the directory server 293 may receive the request through a network such as the Internet. The vehicle 100 may connect to the Internet via a cellular (or other wireless technology) component associated with the vehicle 100. Alternatively, the vehicle 100 may connect to the Internet using a mobile device associated with one or more passengers of the vehicle 100.

At 530, the directory server 293 determines one or more regions that correspond to the location 260 of the vehicle 100. The regions may be geographic regions and the location 260 may be the location 260 associated with the request. The directory server 293 may determine the one or more regions by determining which geographic regions include the location 260 (or locations 260) provided by the vehicle 100. In some implementation, each location 260 may be a geographical coordinate and the directory server 293 may determine the geographic regions that include the geographical coordinates. Any method for determining regions associated with locations 260 may be used.

At 540, the directory server 293 generates a regional server directory 270 for the vehicle 100 based on the determined one or more regions. In some embodiments, the directory server 293 may generate the regional server directory 270 by determining the regional servers 295 associated with each of the determined one or more regions. The directory server 293 may then generate the regional server directory 270 that identifies the determined regional servers 295 and the list of services that each regional server 295 provides. The directory server 293 may further include any information needed by the vehicle 100 to connect with each regional server 295 such as passwords and addresses. If there are any vehicles that provide services in the determined one or more regions, the directory server 293 may further identify them in the regional server directory 270.

At 550, the directory server 293 provides the regional server directory 270 to the vehicle 100. The vehicle 100 may then use the regional server directory 270 to request one or more services from the regional servers 295. In embodiments where the vehicle 100 is not yet at the location 260 associated with the request, the connection module 220 of the services system 170 may cache or store the regional server directory 270 until the vehicle 100 reaches a location 260 associated with the regional server directory 270.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the services system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the services system 170, and/or the autonomous driving module(s) 160 may control some or all of these vehicle systems 140 and, thus, may be partially or fully autonomous.

The processor(s) 110, the services system 170, and/or the autonomous driving module(s) 160 can be operatively connected to communicate with the various vehicle systems 140 and/or individual components thereof. For example, returning to FIG. 1, the processor(s) 110, the services system 170, and/or the autonomous driving module(s) 160 can be in communication to send and/or receive information from the various vehicle systems 140 to control the movement, speed, maneuvering, heading, direction, etc. of the vehicle 100. The processor(s) 110, the services system 170, and/or the autonomous driving module(s) 160 may control some or all of these vehicle systems 140.

The processor(s) 110, the services system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the services system 170, and/or the autonomous driving module(s) 160 can control the direction and/or speed of the vehicle 100.

The processor(s) 110, the services system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the services system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like, conventional procedural programming languages, such as the "C" programming language or similar programming languages, and scripting languages such as Python. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

What is claimed is:

1. A system for providing services to vehicles comprising:
one or more processors; and
a memory communicably coupled to the one or more processors and storing:
  a connection module including instructions that when executed by the one or more processors cause the one or more processors to:
    send a request for a regional server directory to a directory server from a vehicle, wherein the request includes a location of the vehicle; and
    in response to the request, receive the regional server directory from the directory server by the vehicle, wherein the regional server directory is associated with a geographic region that includes the location of the vehicle, wherein the regional server directory identifies:
      a plurality of regional servers associated with the geographic region, each of the plurality of regional servers being associated with one or more services, and
      one or more other vehicles associated with the geographic region, each of the one or more other vehicles being associated with at least one of the one or more services; and
  a service module including instructions that when executed by the one or more processors cause the one or more processors to:
    determine, using the regional server directory, a specific regional server, from the plurality of regional servers, that provides a specific service;
    request the specific service associated with the specific regional server;
    receive information associated with the specific service from the specific regional server; and
    request a service, indirectly through a regional server of the plurality of regional servers, of the one or more services associated with a selected other vehicle of the one or more other vehicles identified by the regional server directory by the vehicle.

2. The system of claim 1, wherein the one or more services include one or more of a traffic service, a public announcement service, a vehicle speed service, a weather service, a traffic light service, or an accident service.

3. The system of claim 1, wherein the request for the regional server directory includes authentication information useable by the directory server to authenticate the vehicle.

4. The system of claim 1 wherein the service module further includes instructions that when executed by the one or more processors cause the one or more processors to receive information associated with the service from the selected other vehicle by the vehicle.

5. The system of claim 4, wherein the instructions to request the service of the one or more services associated with the selected other vehicle comprises instructions to request the service using a networking connection between the vehicle and the selected other vehicle.

6. A method for providing services to vehicles, the method comprising:
sending a request for a regional server directory to a directory server from a vehicle, wherein the request includes a location of the vehicle;
in response to the request, receiving the regional server directory from the directory server by the vehicle, wherein the regional server directory is associated with a geographic region that includes the location of the vehicle, wherein the regional server directory identifies:
a plurality of regional servers associated with the geographic region, each of the plurality of regional servers being associated with one or more services, and
one or more other vehicles associated with the geographic region, each of the one or more other vehicles being associated with at least one of the one or more services;
determining, using the regional server directory, a specific regional server, from the plurality of regional servers, that provides a specific service;
requesting the specific service associated with the specific regional server; and
receiving information associated with the specific service from the specific regional server; and
requesting a service, indirectly through a regional server of the plurality of regional servers, of the one or more services associated with a selected other vehicle of the one or more other vehicles identified by the regional server directory by the vehicle.

7. The method of claim 6, wherein the one or more services include one or more of a traffic service, a public announcement service, a vehicle speed service, a weather service, a traffic light service, or an accident service.

8. The method of claim 6, wherein the request for the regional server directory includes authentication information useable by the directory server to authenticate the vehicle.

9. The method of claim 6, further comprising receiving information associated with the service from the selected other vehicle by the vehicle.

10. The method of claim 9, wherein the requesting the service of the one or more services associated with the selected other vehicle comprises requesting the service using a networking connection between the vehicle and the selected other vehicle.

11. The method of claim 6, wherein the sending the request comprises sending the request from a mobile device associated with a driver of the vehicle.

12. A vehicle, comprising:
a processor; and
a memory storing a module including instructions that when executed by the processor cause the processor to:
determine, using directory:
a specific device that provides a specific service of at least one service, the directory being received from a directory server, the specific device being among a plurality of devices associated with a specific geographic region that includes a location of the vehicle, the specific geographic region being among a plurality of geographic regions the directory server being associated with the specific geographic region, and
another vehicle associated with the specific geographic region and with a service of the at least one service;
send, to the specific device, a request about the specific service;
receive, from the specific device, information about the specific service; and
send, indirectly through a regional device of the plurality of devices, a request about the service of the at least one service.

13. The vehicle of claim 12, wherein the module further includes instructions that when executed by the processor cause the processor to send, to the directory server, a request for the directory.

14. The vehicle of claim 12, wherein:
the specific device is a specific server, and
the plurality of devices are a plurality of servers.

15. The vehicle of claim 12, wherein:
the specific device is a specific other vehicle, and
the plurality of devices are a plurality of other vehicles.

16. The vehicle of claim 15, wherein the instructions to send, to the specific device, the request about the specific service comprise instructions to send, to the specific device via an intermediary server, the request about the specific service.

17. The vehicle of claim 12, wherein the specific service includes a least one one of a traffic service, a public announcement service, a vehicle speed service, a weather service, a traffic light service, or an accident service.

18. The vehicle of claim 13, wherein the request for the directory includes authentication information useable by the directory server to authenticate the vehicle.

19. The vehicle of claim 13, wherein the instructions to send, to the directory server, the request for the directory comprise instructions to send, to the directory server and in response to a determination that an age of the directory stored in a cache of the vehicle is older than a threshold age, the request for the directory.

20. The vehicle of claim 12, wherein the memory further includes instructions that when executed by the processor cause the processor to receive information associated with the service of the at least one service.

* * * * *